April 9, 1935.  G. R. OHMART  1,996,826
REFRIGERATING APPARATUS
Filed May 17, 1932
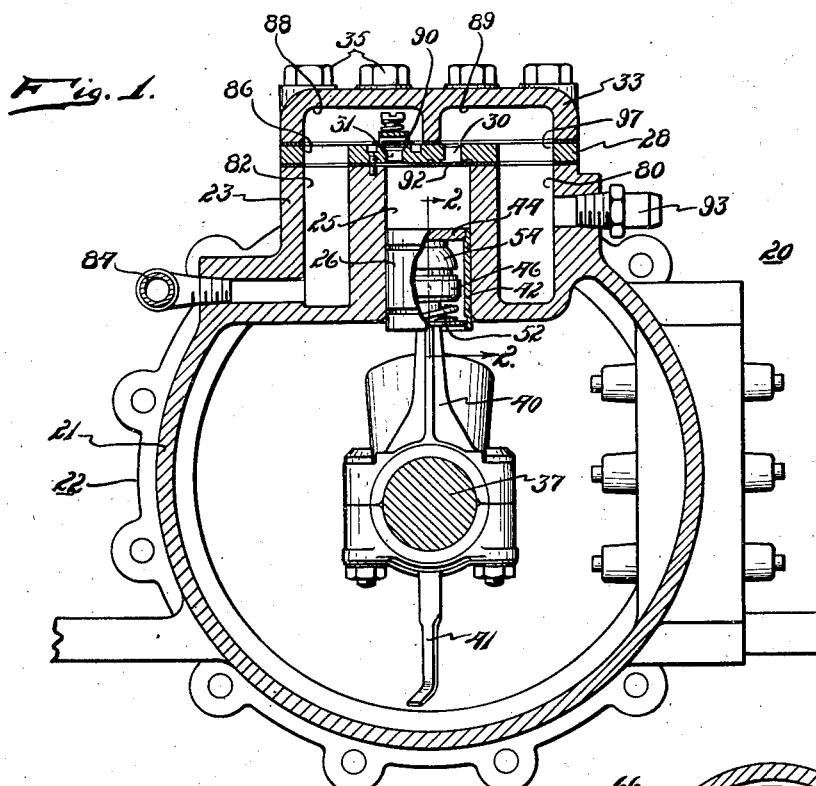
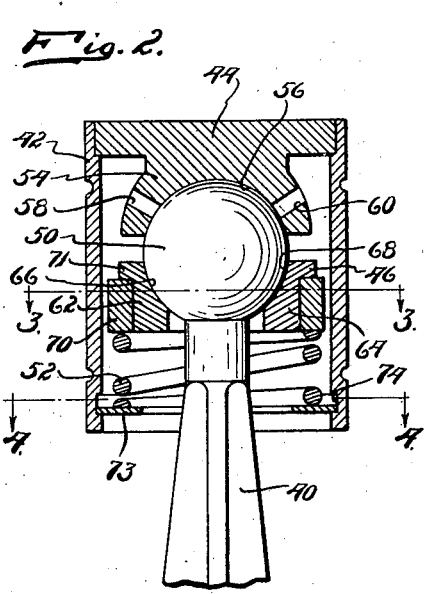
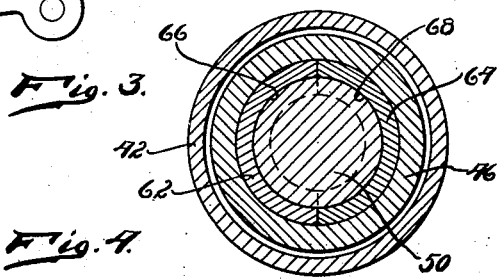
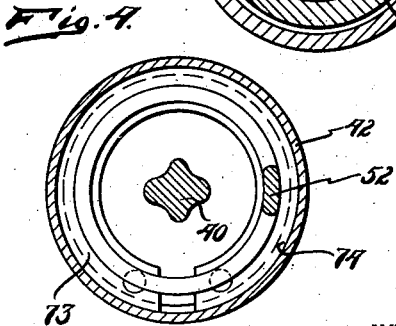
INVENTOR.
GRAYSTON R. OHMART
BY Ralph E. Baker
ATTORNEY.

Patented Apr. 9, 1935

1,996,826

UNITED STATES PATENT OFFICE 1,996,826

REFRIGERATING APPARATUS

Grayston R. Ohmart, Detroit, Mich., assignor to Kelvinator Corporation, Detroit, Mich., a corporation of Michigan Application May 17, 1932, Serial No. 611,857

4 Claims. (Cl. 309—20)

This invention relates to refrigerating apparatus and more particularly to compressors employed in such apparatus.

In compressors for compressing vaporized refrigerant and in fact in any machine in which a piston is connected to be actuated by a connecting rod, the connection is usually made by a wrist pin. This wrist pin extends transversely through aligned bores formed in the piston and through one end of the connecting rod which usually includes a bushing to provide a bearing surface for the pin. This type of connection has been found to be objectionable chiefly in that the wrist pin and the connecting rod bushing become worn after a time, forming a loose connection, which results in so called wrist pin and/or connecting rod knocks. This noisy connection is undesirable and particularly so in refrigerant compressors employed for household use. In order to remedy this condition it has been necessary in the past to either replace the piston and connecting rod or to provide a new wrist pin and bushing, either operation of which required dissembling the machine and consequently was costly.

Accordingly one of the objects of the invention is to provide a piston and a connecting rod therefor, connected in a new and improved manner.

Another object of the invention is to provide a refrigerant compressor in which the piston for compressing the refrigerant and the connecting rod for actuating the piston are maintained in connection by resilient means whereby the possibility of loose connections due to frictional wear between the parts is eliminated.

Another object of the invention is to provide a piston and a connecting rod which will be noiseless in operation, yet of marked simplicity as a whole and in respect to each of its component parts so that its manufacture is economically facilitated both as regards to the parts and their assembly.

Further objects and advantages of the present invention will be apparent from the following description, reference being had to the accompanying drawing, wherein a preferred form of the present invention is clearly shown.

In the drawing:

Fig. 1 is an end view in cross section of a refrigerant compressor embodying features of the present invention;

Fig. 2 is a view partly in section and partly in elevation taken in the direction of the arrows 2—2 of Fig. 1;

Fig. 3 is a view in cross section taken in the direction of the arrows 3—3 of Fig. 2; and Fig. 4 is a view in cross section taken in the direction of the arrows 4—4 of Fig. 2.

Referring to the drawing, 20 designates a compressor comprising in general a casing 21 including a crankcase portion 22 formed at the top to provide a cylinder block 23. The cylinder block 23 is provided with a cylinder or compression chamber 25 in which a piston 26 is adapted to be reciprocated. The compressor also includes a valve plate 28 mounted on the cylinder block. The plate 28 forms the top wall of the chamber 25 and is provided with an inlet port 30 and a discharge port 31 in communication with the chamber 25. Mounted upon the valve plate is a compressor head portion 33. The head portion 33 and valve plate 28 are rigidly secured to the cylinder block by screws 35.

A crankshaft 37 is journaled to be rotated within the crankcase 22. One end of a connecting rod 40 is connected to the crankshaft, the other end 40 being connected to actuate the piston 26. The crankshaft may be arranged to rotate in an oil bath contained in the crankcase and a splash member 41 may be associated with the connecting rod to throw oil as one method of lubricating the moving elements of the compressor.

In order to provide a piston and a connecting rod so connected that wear therebetween will be automatically compensated for and so that they will be noiseless in operation, I have provided resilient means for maintaining the connection therebetween. The piston 26 comprises in general a cylindrical skirt 42 in the top of which is rigidly secured a piston head 44, and a resiliently mounted semi-spherically shaped bearing member 46 cooperates with the piston head to maintain connection with the connecting rod 40. The connecting rod 40 is formed in this instance with a spherical bearing head 50. A suitably designed coiled spring 52 is provided to urge the piston head 44 and the bearing member 46 against the spherical bearing 50.

The piston head 44 may be formed separately as shown and press fitted into the cylinder skirt or it may be formed as an integral part of the skirt. The piston head 44 is formed with a protuberance 54 which extends into the piston skirt 42 and the inner end of the protuberance is formed with a semi-spherical bearing surface 56 to receive the connecting rod head 50. Ports 58 and 60 are provided through which lubricant may pass to lubricate the bearing surface 56.

The bearing member 46 is arranged within the skirt 42 to support the underside of the ball 50 and is preferably formed of two semi-circular portions 62 and 64. The semi-circular portions are each formed with a spherical shaped surface 66 and 68 which cooperate to form the bearing surface for the ball 50. A circular retaining ring 70 is provided to slip over the semi-circular portions to retain them in position. A circular flange 71 formed on the semi-circular portions provides a shoulder against which the ring 70 bears. The lower end of the spring is supported by a retainer 73 which may be in the form of a split disc ring adapted to be sprung into a circular slot 74 formed in the skirt 42. As shown the spring is under compression between the ring 70 and the spring retainer so that any slack due to frictional wear of the bearing surface is automatically taken up by the expansion of the spring.

While in the preferred form of the invention set forth herein for the purpose of illustration, the application of the principles of the invention to a refrigerant compressor is disclosed, it will be understood that the invention is broader in scope and is applicable to any mechanism in which it is desired to connect a piston and a connecting rod.

In the refrigerant compressor shown in connection with the invention, the cylinder block is formed to provide a refrigerant inlet chamber 80 and a refrigerant outlet chamber 82. The inlet chamber 80 is in communication through conduit 93 with a refrigerant evaporator (not shown) and the outlet chamber 82 is in communication through conduit 84 with a condenser (not shown).

The chambers 80 and 82 are also in communication with the cylinder or compression chamber through registering openings 86 and 97 in the valve plate and communicating chambers 88 and 89 in the head portion 33. In chamber 88 is provided a discharge valve 90 for controlling the discharge port. A reed valve 92 is provided to control the intake port.

On the down or suction stroke of the piston, a partial vacuum is produced within the cylinder whereby the reed valve is flexed downwardly permitting the entrance of fluid through the inlet port to the chambers. On the up or compression stroke, the valve closes the inlet port and the gas is freed through the discharge port whence it is delivered to the condenser.

It will be seen from the foregoing description that I have provided an improved means for maintaining a proper connection between a piston and a connecting rod. It will also be seen that the construction and connection of the piston and connecting rod is such that wear due to friction of the bearings, is automatically compensated for and consequently the piston and connecting rod are noiseless in operation. Another important advantage of such a connection between the connecting rod and piston is that proper alignment between the piston and crankshaft through the connecting rod is easily facilitated and always maintained.

Although only a preferred form of the invention has been illustrated, and that form described in detail, it will be apparent to those skilled in the art that various modifications may be made therein without departing from the spirit of the invention or from the scope of the appended claims.

What I claim as my invention is:

1. In a compressor, the combination of a piston having a skirt, a sectional bearing within said skirt, a connecting rod extending into said skirt in engagement with said sectional bearing, retaining means associated with said sectional bearing to maintain operating engagement between the sectional bearing and said connecting rod, said retaining means being movable relative to said piston to compensate for wear between said connecting rod and said sectional bearing, and a coiled spring arranged so that it continuously tends to move said retaining means.

2. In a compressor, the combination of a piston having a skirt, a bearing within said skirt movable relative to said piston, a connecting rod extending into said skirt in engagement with said bearing, retaining means associated with said bearing to maintain operative engagement between the bearing and said connecting rod, said retaining means being movable relative to said piston to compensate for wear between said connecting rod and said bearing, a removable disc disposed in said skirt, and a spring interposed between said disc and said retaining means in such a manner so that it continuously tends to move said retaining means.

3. In a compressor, the combination of a piston having a skirt, a fixed bearing within said skirt, a connecting rod extending into said skirt in engagement with said bearing, a movable bearing within said skirt, said movable bearing being arranged so that it is free to move laterally and longitudinally within said skirt to align itself with said other bearing and said connecting rod, retaining means associated with said movable bearing to maintain operative engagement between the movable bearing and said connecting rod, said retaining means being movable relative to said piston to compensate for wear between said connecting rod and said movable bearing, and a spring arranged so that it continuously tends to move said retaining means.

4. In a compressor, the combination of a piston, a fixed bearing associated with said piston, a connecting rod in engagement with said fixed bearing, a movable bearing associated with said connecting rod, said movable bearing being arranged so that it is free to move laterally and longitudinally of said piston to align itself with said other bearing and said connecting rod, retaining means associated with said movable bearing to maintain operative engagement between the movable bearing and said connecting rod, said retaining means being movable relative to said piston to compensate for wear between said connecting rod and said movable bearing, and a spring arranged so that it tends to move said retaining means.

GRAYSTON R. OHMART.